(12) United States Patent
Marsetti et al.

(10) Patent No.: US 6,471,051 B2
(45) Date of Patent: Oct. 29, 2002

(54) CONNECTION ELEMENT FOR TWO COMPONENTS, ONE OF WHICH IS TUBULAR

(75) Inventors: Sergio Marsetti, Castelli Calepio; Rodolfo Reatti, Brivio, both of (IT)

(73) Assignee: System Plast S.p.A., Telgate (IT)

( * ) Notice: Subject to any disclaimer, the term of this patent is extended or adjusted under 35 U.S.C. 154(b) by 0 days.

(21) Appl. No.: 09/902,212

(22) Filed: Jul. 10, 2001

(65) Prior Publication Data

US 2002/0046931 A1 Apr. 25, 2002

(30) Foreign Application Priority Data

Jul. 10, 2000 (IT) ........................................ MI2000409 U

(51) Int. Cl.⁷ ............................................... B65G 21/00
(52) U.S. Cl. ................. 198/861.1; 198/836.1; 403/409.1; 403/167; 403/233
(58) Field of Search ............................ 198/836.1, 860.1, 198/861.1; 403/167, 233, 374.1, 374.4, 367, 409.1

(56) References Cited

U.S. PATENT DOCUMENTS 2,034,051 A  *  3/1936  Lipp ........................ 403/374.4
5,205,400 A  *  4/1993  Breuss et al. ............ 198/861.1

* cited by examiner

*Primary Examiner*—Joseph E. Valenza
(74) *Attorney, Agent, or Firm*—Steinberg & Raskin, P.C.

(57) ABSTRACT

A connection element for at least two components (15, 7) of a conveyor support or guide structure, of the type comprising a body (1) presenting a first element (2) having first (3) for removably fixing a portion (15A) of one (15) of said components, and a second element (5) having second part (6) for removably fixing a tubular portion (7A) of said other component (7), in which the first and second fixing (3, 6) are distinct and separated from each other, the first fixing (3) having a plurality of slotted apertures (3A–D), and the second fixing (6) having an expansion member (8) able to expand within said tubular portion (7A) to fix it to said second element (5).

17 Claims, 1 Drawing Sheet

CONNECTION ELEMENT FOR TWO COMPONENTS, ONE OF WHICH IS TUBULAR

FIELD OF THE INVENTION

The present invention relates to a connection element for two components of a conveyor support or guide structure.

BACKGROUND OF THE INVENTION

In known connection elements the means for fixing the connection element to a tubular component of the conveyor structure are positioned externally in the lower part of the element, spaced from and perpendicular to the longitudinal axis of said tubular component. As these fixing means can be operated only laterally, they considerably limit the application of the connection elements, which can be used only if they lie in a position in which there is sufficient space to tighten said fixing means. Generally, the fixing means comprise a nut and a bolt, which requires the use of two tools to fix the connection element to the tubular component and further complicates this operation.

Moreover, the other fixing means of the connection element, for connecting a second component of the conveyor support structure other than the tubular component, generally allow only a limited scope for positioning said second component in different angular positions in the same plane.

OBJECTS AND SUMMARY OF THE INVENTION

An object of the present invention is to provide a connection element which (a) simplifies and accelerates the operations involved in connecting such connection element to a tubular component of a conveyor, (b) enables this connection to be made even when used in narrow or laterally difficultly accessible spaces, and (c) enables the second connected component to be better and more easily positioned.

This and further objects which will be apparent to a person skilled in the art are attained by a connection element in accordance with the invention described below.

The present invention will be better understood from the accompanying drawings, which are provided by way of a non-limiting example.

DETAILED DESCRIPTION OF THE PREFERRED EMBODIMENT

Figure 1:
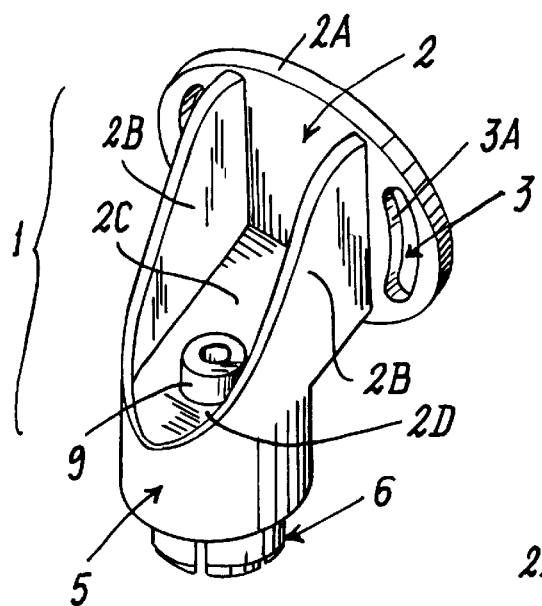
FIG. 1 is a top perspective view of a connection element according to the invention.

With reference to the drawings, a connection element of the invention comprises a body, indicated overall by 1, presenting a first part 2 comprising first means 3 for removeable attachment to a substantially flat portion 15A of a first component 15 of a conveyor (not shown), and a second part 5 comprising second means 6 for removably fixing a tubular portion 7A of a second component of the conveyor.

Figure 3:
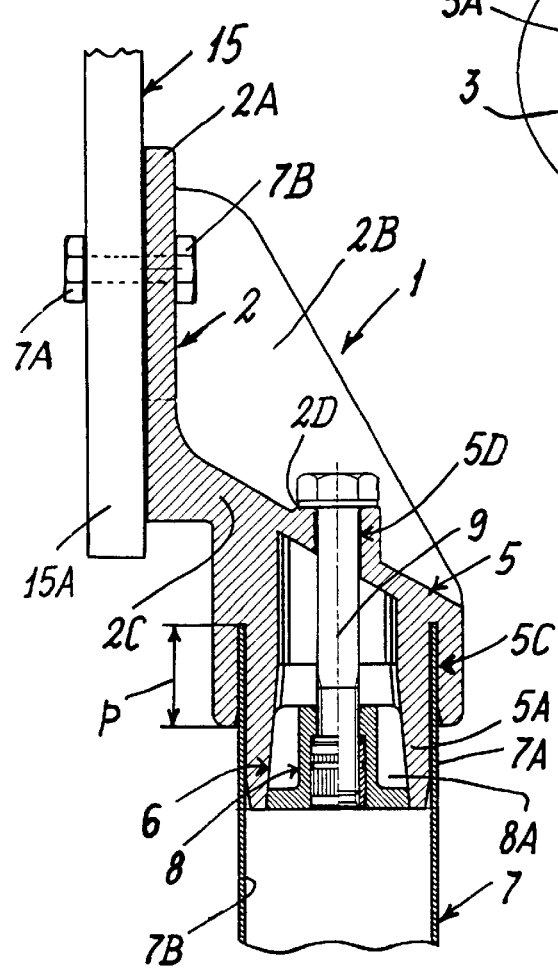
FIG. 3 is a section therethrough taken on the line 3/3 of FIG. 2.

More specifically, the first part 2 of the body 1 presents a flat element 2A of oval shape, integral with the second part 5 and connected to this latter part by two webs 2B, and an intermediate part 2C. The flat element 2A presents two apertures 3A concentric with each other and with a center C of the element 2B, and extending through an equal portion of circumference T1. The two apertures are symmetrical about a horizontal axis 0 of the flat element 2B. The two apertures 3A enable the component 15, fixed to the flat element 2A by conventional nuts and bolts 7A, B (FIG. 3) passing through said apertures, to be rotated about the center C of the flat element.

Figure 2:
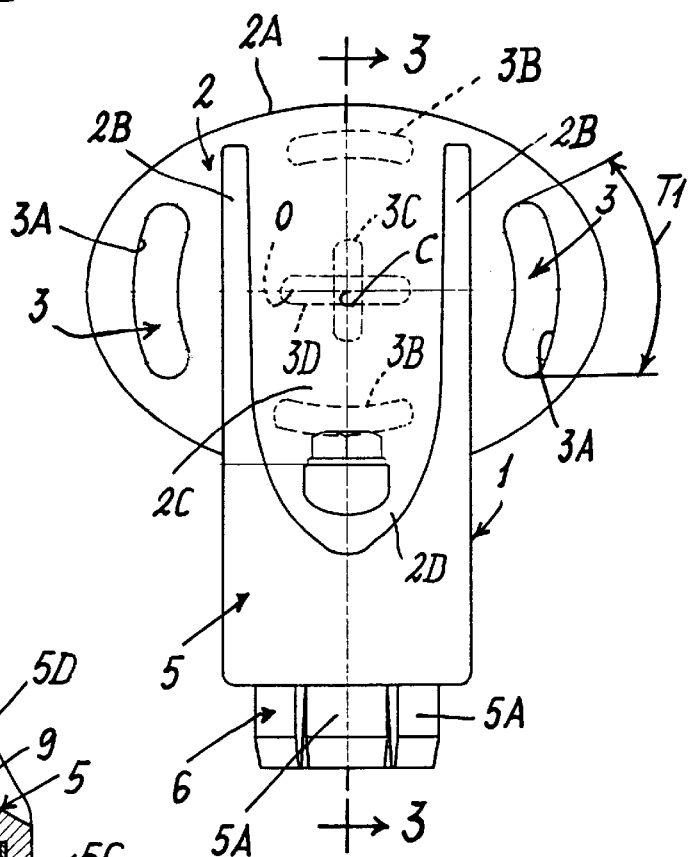
FIG. 2 is a rear elevation view thereof.

In addition to the two concentric slots 3A, further slots could also be provided (shown dashed in FIG. 2) having the same center C but of different radius (FIG. 3), or disposed vertically (3C), or horizontally (3D).

The second part 5 of the body 1 presents a substantially tubular shape terminating with a plurality of tongues 5A arranged to penetrate into the tubular portion 7A of the conveyor structure, and an expansion member 8 which interacts with said tongues 5A to cause them to adhere to the inner surface 7B of said tubular portion 7A, so fixing it to the connection element. At its lower edge, the part 2 also presents an annular seat 5C to house a portion P of the upper edge of the tubular component 7. The part 2 also presents a vertical seat 5D for passage of a screw 9 for operating the expansion member 8. This seat 5D is open at a free upper portion 2D of the connection element provided between the two webs 2B and hence always easily accessible to an operator.

The screw 9 engages in a threaded seat of a usual wedge element 8A such that on tightening the screw 9 this wedge rises to widen the tongues 5A and, vice versa, on loosening the screw 9, it moves downwards to enable the tongues to return elastically inwards.

It should be noted that as the means for fixing the connection element to the tubular component are of expansion type and comprise an operating screw provided in a vertical position accessible from above, they are always easily operable with a single tool, whatever the position of the connection element itself.

Finally, it should be noted that the aforedescribed embodiment is provided by way of non-limiting example and that numerous variants are possible, all falling within the same inventive concept, for example the connection means could be formed in a different manner from that shown, but still conventional for a person skilled in this art. For example, in a possible simplified variant, the tongues 5A could be omitted and the wedge member 8A could act directly against the inner surface of the tubular portion 7A. It should also be noted that both the wedge member 8A and that portion of the connection element which interacts with the tubular portion 7A can have any geometrical cross-section, for example circular, square or hexagonal. Alternatively, more than one component of the conveyor support structure could be fixed to the first part 2.

Although the invention has been described with respect to preferred embodiments, it is understood that changes and modifications can be made which are within the fill intended scope of the invention as defined by the appended claims.

What is claimed is:

1. A connection element for at least two components (15, 7) of a conveyor support or guide structure, of the type comprising a body (1) presenting a first part (2) comprising first fixing means (3) for removable attachment to a portion (15A) of one (15) of said components, and a second part (5) comprising second fixing means (6) for removable attachment to a tubular portion (7A) of said other component (7), characterized in that the first and second fixing means (3, 6) are distinct and separated from each other, the first fixing means (3) comprising a plurality of slotted apertures (3A–D), the second fixing means (6) comprising an expansion member (8) able to expand within said tubular portion (7A) to fix it to said second part (5).

2. An element as claimed in claim 1, characterized in that the slotted apertures (3A) are at least two in number, and are mutually concentric.

3. An element as claimed in claim 2, characterized in that the slots are disposed symmetrically about a horizontal axis (O) or vertical axis (V) of the first part (2) of the body (1) of said element.

4. A connection element as claimed in claim 1, characterized in that the second fixing means (6) comprises for said expansion member (8), an operating member (9) housed in the body (1) in such a manner as to be accessible from and operable from above.

5. A connection element as claimed in claim 4, characterized in that the operating member (9) is provided in a seat (5D) provided in its second part (5), said seat being open upwardly such as to enable an operating portion of said member to emerge.

6. An element as claimed in claim 5, characterized in that the upper aperture of the seat (50) for the operating member is provided in an intermediate portion 5 joining together the two parts (2, 5) of the element body (1).

7. An element as claimed in claim 6, characterized in that the upper aperture is provided between two stiffening webs (2B) connecting the upper part (2) to the lower part (5).

8. An element as claimed in claim 1, characterized in that the first part (2) presents a flat portion (2A) comprising the slotted apertures (3A).

9. An element as claimed in claim 8, characterized in that the flat portion is of oval shape.

10. An element as claimed in claim 1, characterized in that the body (1) is formed in one piece.

11. An element as claimed in claim 10, characterized in that the body (1) houses in its interior the second fixing means.

12. An element as claimed in claim 1, characterized in that the second part (5) terminates downwardly with a plurality of tongues (5A) arranged to interfere with an expansion member (8A).

13. An element as claimed in claim 1, characterized in that the second part (5) comprises an annular seat facing downwardly for housing a tubular end portion (P) of the second component (7).

14. A connection element for removable attachment to both a first member of a conveyor and a tubular second member of said conveyor, said connection element comprising a. body part,
  b. first means at the upper rear of said body part removably attachable to said first member, said first means including a plurality of slotted apertures, and
  c. second means at the lower front of said body attachable to said second member, said second means comprising an expansion member adapted to expand within said tubular second member.

15. A connection element for removable attachment to both a first member of a conveyor and a tubular second member of said conveyor, said connection element comprising a. a body part,
  b. first means at an upper part of said body part removably attachable to said first member,
  c. second means at a lower portion of said body part removably attachable to said second member, said second means comprising an expansion member adapted to expand within said tubular second member, said first and second means being distinct and separated from each other, and
  d. third means operating said second means being operable from above said second means.

16. A connection element according to claim 14 wherein said first means comprises an upward extending element with horizontal apertures therethrough, and said second means comprises a downward extending element adapted to receive said tubular member when extended upwardly.

17. A connection element according to claim 16 wherein said second means has a central vertical axis extending downwardly, and said first means has a vertical surface for to said first element, and said vertical axis and said vertical surface are horizontally displaced from each other.

* * * * *